(12) United States Patent
Lin et al.

(10) Patent No.: US 12,194,401 B2
(45) Date of Patent: *Jan. 14, 2025

(54) AIR-OIL SEPARATOR

(71) Applicant: GE AVIATION SYSTEMS LLC, Grand Rapids, MI (US)

(72) Inventors: Lanchao Lin, Dayton, OH (US); Richard Louis Heil, Medway, OH (US); Jan Zywot, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/356,970

(22) Filed: Jun. 24, 2021

(65) Prior Publication Data
US 2021/0322910 A1    Oct. 21, 2021

Related U.S. Application Data

(63) Continuation of application No. 15/875,401, filed on Jan. 19, 2018, now Pat. No. 11,058,979.

(51) Int. Cl.
*B01D 45/16* (2006.01)
*F04B 23/02* (2006.01)
*F04B 39/16* (2006.01)
*F01M 13/04* (2006.01)

(52) U.S. Cl.
CPC .............. *B01D 45/16* (2013.01); *F04B 23/02* (2013.01); *F04B 39/16* (2013.01); *B01D 2257/702* (2013.01); *F01M 2013/0427* (2013.01)

(58) Field of Classification Search
CPC ... B01D 45/16; B01D 2257/702; F04B 23/02; F04B 39/16; F01M 2013/0427; F01M 13/04
See application file for complete search history.

(56) References Cited

U.S. PATENT DOCUMENTS

| | | | | |
|---|---|---|---|---|
| 3,129,173 | A | * 4/1964 | Schulze | B04C 5/04 210/512.1 |
| 3,378,104 | A | 4/1968 | Venable | |
| 4,217,120 | A | 8/1980 | Reynolds | |
| 4,559,068 | A | * 12/1985 | Lagerstedt | B01D 45/12 55/459.1 |
| 4,819,417 | A | * 4/1989 | Bryant | A01D 43/077 56/16.6 |
| 5,221,299 | A | * 6/1993 | Boring | B04C 5/15 95/271 |
| 5,236,479 | A | * 8/1993 | Billingsley | B01D 50/20 55/459.2 |
| 6,152,120 | A | 11/2000 | Julazadeh | |

(Continued)

FOREIGN PATENT DOCUMENTS

| | | |
|---|---|---|
| CN | 2565526 Y | 8/2003 |
| CN | 104600886 A | 5/2015 |
| CN | 104971554 A | 10/2015 |

*Primary Examiner* — Dung H Bui
(74) *Attorney, Agent, or Firm* — McGarry Bair PC (57) ABSTRACT

An air-oil separator assembly can include an air-oil mixture inlet, an air outlet, and an oil outlet, a housing defining a cylindrical separating cavity, and an outlet conduit disposed within the separating cavity, wherein, outlet conduit is adapted to receive oil removed by the air-oil separator assembly from a flow containing an air-oil mixture fluid received by the air-oil mixture inlet.

14 Claims, 6 Drawing Sheets

(56) References Cited

U.S. PATENT DOCUMENTS

| | | | |
|---|---|---|---|
| 6,475,256 B2* | 11/2002 | Matsubara | F01M 13/04 |
| | | | 55/459.1 |
| 6,709,476 B2 | 3/2004 | Kitano et al. | |
| 7,063,734 B2 | 6/2006 | Latulipe et al. | |
| 7,524,357 B2 | 4/2009 | Daukant | |
| 7,566,356 B2 | 7/2009 | Latulipe et al. | |
| 7,993,425 B2 | 8/2011 | Corattiyil et al. | |
| 8,443,843 B2 | 5/2013 | Mount et al. | |
| 10,291,101 B2 | 5/2019 | Wang et al. | |
| 2002/0194988 A1* | 12/2002 | Betting | B04C 3/00 |
| | | | 96/389 |
| 2005/0279700 A1* | 12/2005 | Wagner | B04C 5/185 |
| | | | 210/512.1 |
| 2006/0277714 A1* | 12/2006 | Dunning | B02C 18/14 |
| | | | 15/340.2 |
| 2008/0029071 A1* | 2/2008 | Saito | B01D 19/0052 |
| | | | 123/518 |
| 2009/0314161 A1* | 12/2009 | Al-Alusi | B04C 11/00 |
| | | | 95/271 |
| 2010/0115727 A1* | 5/2010 | Oh | A47L 9/1625 |
| | | | 96/416 |
| 2013/0068562 A1 | 3/2013 | Cornet | |
| 2019/0118131 A1* | 4/2019 | Schaub | B04C 3/06 |
| 2019/0224602 A1* | 7/2019 | Lin | F04B 23/02 |

* cited by examiner

AIR-OIL SEPARATOR

CROSS REFERENCE TO RELATED APPLICATION(S)

This application is a continuation of U.S. patent application Ser. No. 15/875,401, filed Jan. 19, 2018, now allowed U.S. Pat. No. 11,058,979 which is incorporated herein in its entirety.

BACKGROUND OF THE INVENTION

Electric machines, such as electric motors and/or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having main windings that are driven to rotate by a source of rotation, such as a mechanical or electrical machine, which for some aircraft may be a gas turbine engine.

In some configurations, the generator can be connected with a gear box to drive the generator from the source of rotation, or to further drive additional components from the source of rotation. In some instances, the gear box and generator can share an airflow, coolant, oil, pumps, or the like.

BRIEF DESCRIPTION OF THE INVENTION

In one aspect, aspects of the disclosure relate to an air-oil separator, including a housing having a cavity wall defining a separating cavity fluidly connected with an air-oil mixture inlet, an outlet conduit fluidly connected with an air outlet, and disposed within the separating cavity and coaxial with the separating cavity, a semi-spherical dome cap enclosing the separating cavity, and an oil channel circumferentially arranged about the cavity wall and fluidly connected with an oil outlet. The oil channel is adapted to receive oil removed by cyclonic separation from a flow containing an air-oil mixture fluid received by the air-oil mixture inlet, and wherein the dome cap is adapted to redirect the flow from the separating cavity to the outlet conduit.

In another aspect, aspects of the disclosure relate to an air-oil separator, including a housing having a cavity wall defining a separating cavity fluidly connected with an air-oil mixture inlet, an outlet conduit fluidly connected with an air outlet, and disposed within the separating cavity and coaxial with the separating cavity, a dome cap enclosing the separating cavity, and an oil channel circumferentially arranged about the cavity wall and sunk in the cavity wall, the oil channel fluidly connected with an oil outlet. The oil channel is adapted to receive oil removed by cyclonic separation from a flow containing an air-oil mixture fluid received by the air-oil mixture inlet, and wherein the dome cap is adapted to redirect the flow from the separating cavity to the outlet conduit.

In yet another aspect, aspects of the disclosure relate to a method of separating oil from an air-oil mixture fluid, the method including directing a fluid flow including an air-oil mixture into a housing having an inner wall defining a cyclonic separating cavity defining an axis, removing the oil from the fluid flow by way of centripetal forces acing on the oil and delivering the oil to an oil channel sunk in the inner wall, and whereby a helical flow is along a first direction parallel with the axis, and redirecting the fluid flow to an air outlet coaxial, the redirected fluid flow in a second direction parallel with the axis and opposite to the first direction, by a semi-spherical dome cap enclosing the separating cavity fluidly downstream of the helical flow.

DESCRIPTION OF EMBODIMENTS OF THE INVENTION

Aspects of the disclosure can be implemented in any environment using an electric generator or motor assembly, a gear box assembly, or an air-oil separator for separating oil or fluid from an air-oil fluid mixture, regardless of adaptation or usage of the aforementioned components. For purposes of this description, such an electric motor will be generally referred to as an electric machine, electric machine assembly, generator, or similar language, which is meant to clarify that one or more stator/rotor combinations can be included in the machine.

While "a set of" various elements will be described, it will be understood that "a set" can include any number of the respective elements, including only one element. As used herein, the terms "axial" or "axially" refer to a dimension along a longitudinal axis of an electric machine or along a longitudinal axis of a component disposed within the electric machine. As used herein, the terms "radial" or "radially" refer to a dimension extending between a center longitudinal axis of the electric machine, an outer rotational circumference, or a circular or annular component disposed within the electric machine. As used herein, the terms "tangential" or "tangentially" refer to a dimension extending perpendicular to a radial line and an axial direction of a component or assembly described. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e. g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As primarily described herein, the air-oil separator can be adapted to separate oil, such as lubricating oil, cooling oil, or a combination thereof, from an airflow. However, aspects of the disclosure can include any air-liquid separator used, designed, configured, or adapted to separate any liquid from a fluid airflow. In this sense, while the description uses terms such as "oil" or "coolant," aspects of the disclosure are not so limited, and can include any liquid envisioned.

While this description is primarily directed toward an aircraft environment or a turbine engine assembly environment, aspects of the disclosure are applicable in any environment using an air-oil separator. Thus, a brief summary of a contemplated environment should aid in a more complete understanding.

Figure 1:
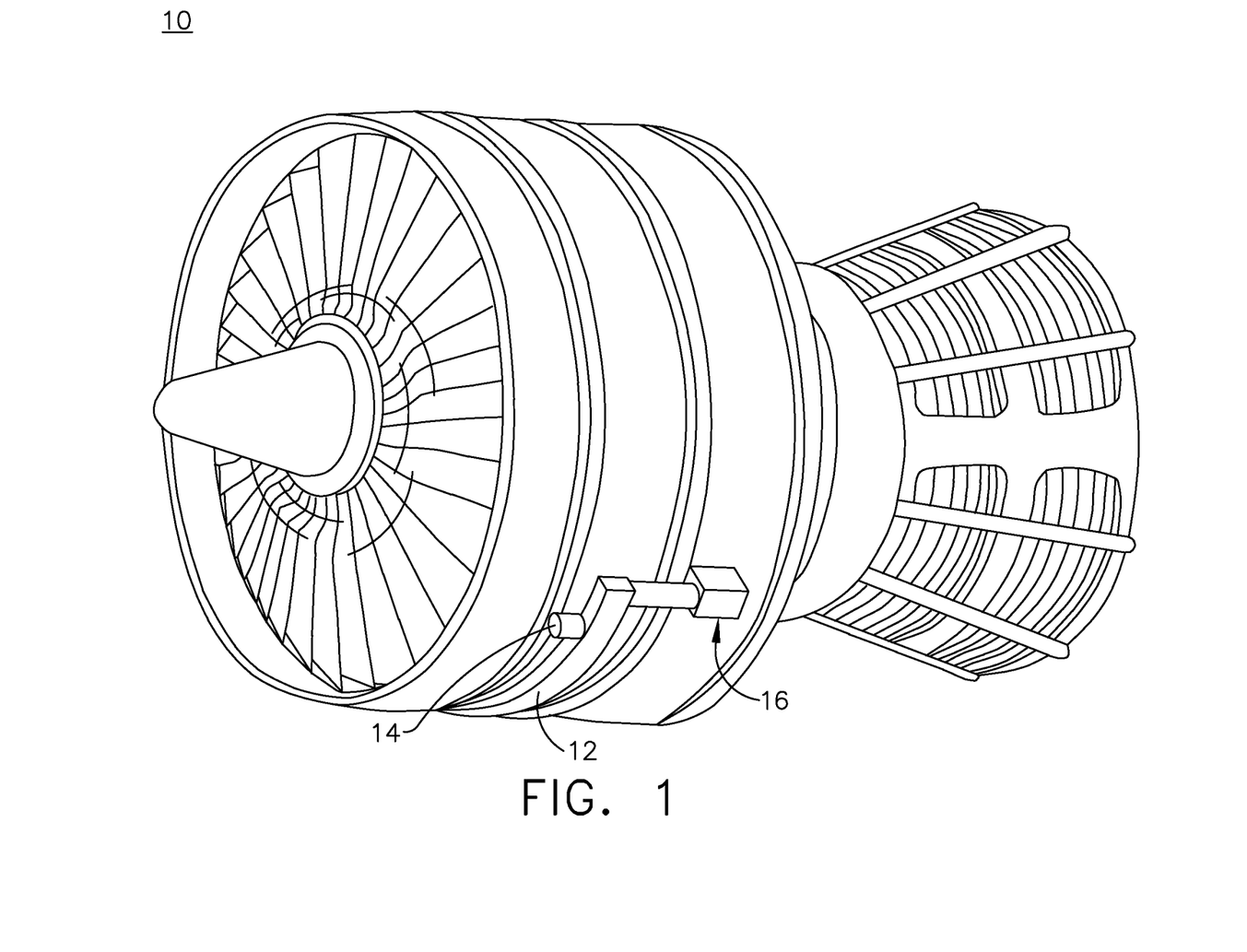
FIG. 1 is a perspective view of a gas turbine engine having a generator assembly, in accordance with various aspects described herein.

FIG. 1 illustrates a gas turbine engine 10 having an accessory gear box (AGB) 12 and a generator assembly 14 mounted to the exterior of the gas turbine engine 10, according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the disclosure and will not be described further herein.

While a generator assembly 14 is shown and described, aspects of the disclosure can include any electrical machine, generator, motor, starter/generator, of combination there, and are not limited to generator aspects that can provide electrical power. For instance, in one non-limiting example, a generator can operate in a power generation mode to provide power, or in a motor mode, wherein power is consumed to generate rotational force, such as propulsion. Non-limiting examples of the generator assembly 14 can include synchronous machine architectures.

Figure 2:
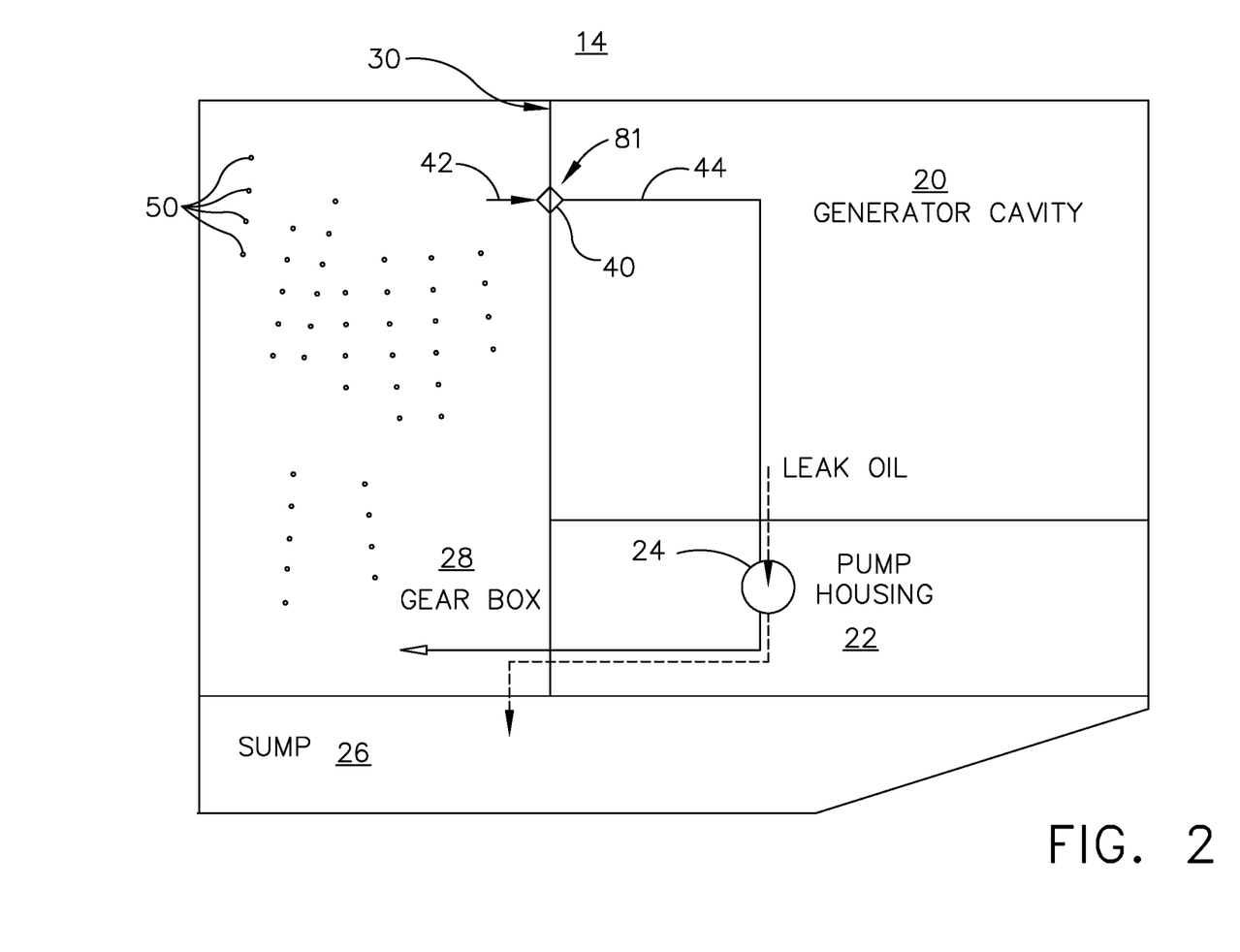
FIG. 2 is a schematic view of the generator assembly of FIG. 1 having an air-oil separator at a generator assembly wall, in accordance with various aspects described herein.

FIG. 2 illustrates one non-limiting schematic view of the generator assembly 14 of FIG. 1, in accordance with aspects of the disclosure. For instance, the generator assembly 14 can include a generator cavity 20 housing a generator (not shown), a pump housing 22 housing a fluid pump, such as an oil pump 24 or a scavenger pump, a sump 26 adapted to contain, hold, or supply fluid, such as oil, and a gear box 28. In one non-limiting aspect, the generator cavity 20 can be separated from the gear box 28 by a wall, including but not limited to a generator end cap wall 30.

Further non-limiting aspects of the disclosure can be included wherein at least a subset of the generator cavity 20, the gear box 28, and the like, can include a flow of air, a fluid such as coolant, oil, or the like, or a combination thereof. In one non-limiting example, the gear box 28 can receive a flow of fluid, oil, coolant, or the like, from an oil pump 24 (the flow of oil illustrated schematically by arrow). In another non-limiting aspect of the disclosure, the oil flow can be supplied from an oil flow source, such as a collection of leak oil scavenged from the generator assembly 14, the sump 26, a combination thereof, or another fluid source, including another liquid pump or component not shown. In one non-limiting example, the oil flow provided by liquid source or oil pump 24 the can lubricate or cool gears or components of the gear box 28. In another non-limiting aspect of the disclosure, the oil provided to the gear box 28 can be mixed with or otherwise atomized to flow within an airflow of the gear box 28, creating an air-oil mixture represented by oil droplets 50. The air-oil mixture can include a mixture with varied concentrations of oil.

The air-oil mixture containing oil droplets 50 can be received at the generator end cap wall 30, at an air-oil mixture input 42 of an air-oil separator 40. The air-oil separator 40 can operably effect the separating or removal of the oil or oil droplets 50 from the air-oil mixture, to a separated or removed oil outlet 44. The "clean" or "oil-less" airflow can further be received by the generator cavity 20 by way of an airflow outlet 81. The removed oil outlet 44 can be fluidly connected with, or otherwise provided to deliver an oil flow to another destination, including but not limited to, the generator assembly 14, the pump housing 22, the oil pump 24, the sump 26, a combination thereof, or another oil flow destination. In another non-limiting aspect of the disclosure, flow through the removed oil outlet 44 can be combined with additional oil flows, such as the leak oil or other oil scavenged from the generator assembly 14.

In one non-limiting aspect of the disclosure, the delivery of the air-oil mixture containing oil droplets 50 from the gear box 28, through the air-oil separator 40, and through the generator cavity 20, can be enabled by way of a fluid pressure differential between a first generator assembly compartment, such as the gear box 28, and a second generator assembly compartment, such as the generator cavity 20. Thus, in one non-limiting example, the gear box 28, the generator cavity 20, or a combination thereof can be at least partially fluidly sealed such that a pressure differential between the compartments 28, 20 can be included, introduced, exposed, enabled, or the like. In one non-limiting example, a negative pressure or negative pressure differential can be introduced in the generator cavity 20, creating a "drawing-in" of the air-oil mixture containing oil droplets 50 from the gear box 28. In another non-limiting example, a positive pressure or positive pressure differential can be introduced in the gear box 28, creating a "pushing" of the air-oil mixture containing oil droplets 50 to the generator cavity 20.

Regardless of the source or effective results of the fluid pressure differential between the gear box 28 and the generator cavity 20, aspects of the disclosure are included wherein the gear box 28 and generator cavity 20 are fluidly connected by way of the air-oil separator 40, such that the movement, transfer, or the drawing-in or pushing of the air-oil mixture containing oil droplets 50 between the gear box 28 and the generator cavity 20 traverses through the air-oil separator 40.

Figure 3:
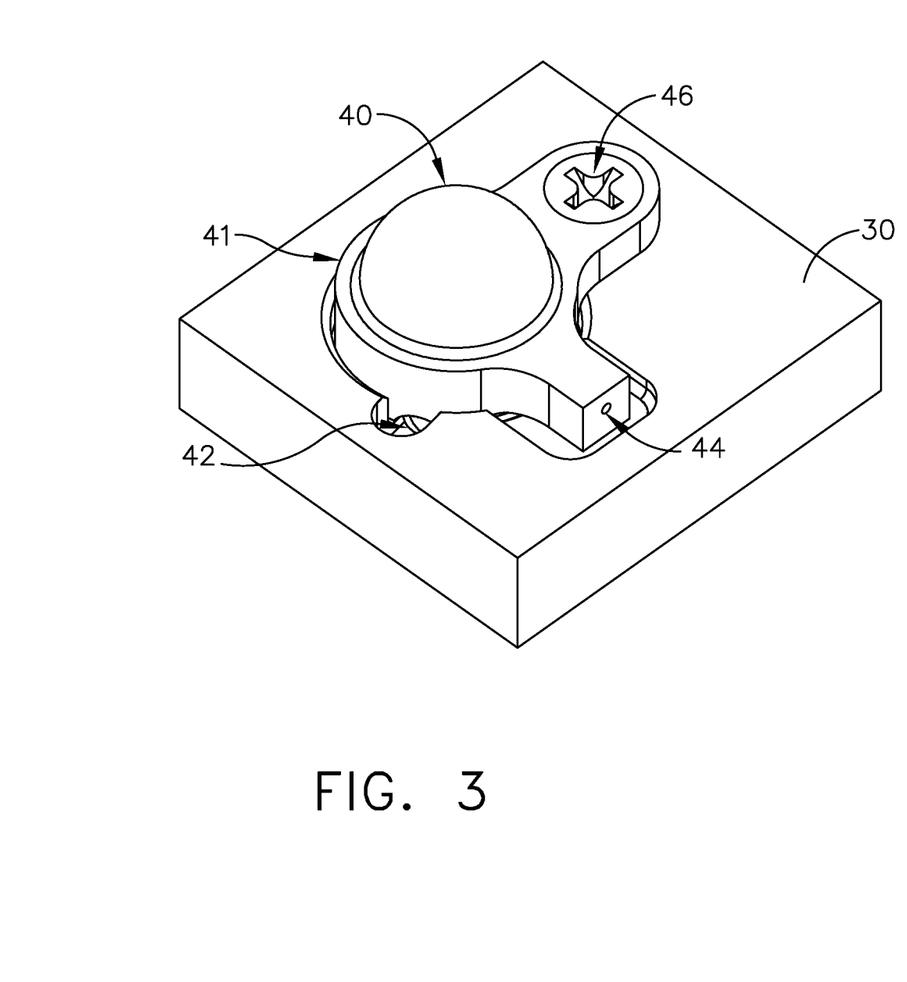
FIG. 3 is an isometric view of aspects of the air-oil separator and generator assembly wall of FIG. 2, in accordance with various aspects described herein.

FIG. 3 illustrates one non-limiting example of the air-oil separator 40, shown disposed at a portion of the generator end cap wall 30. As shown, non-limiting aspects of the air-oil separator 40 can include a housing 41 at least partially received within, or sunk within, the generator end cap wall 30. As mentioned herein, the air-oil separator 40 can include the air-oil mixture input 42 and the oil outlet 44. As shown, the air-oil separator 40 can be connected or coupled with the generator end cap wall 30 by a mechanical connector, including but not limited to, a clip interface or a faster interface, such as a screw 46. Further alternative mounting techniques can be included, such as epoxy, adhesive, or force or tension mountings. Aspects of the disclosure can be included wherein the mechanical connectors are permanently or removably connected with the corresponding mechanical interfaces to hold, retain, restrain, or otherwise connect the air-oil separator 40 with the generator end cap wall 30.

Figure 4:
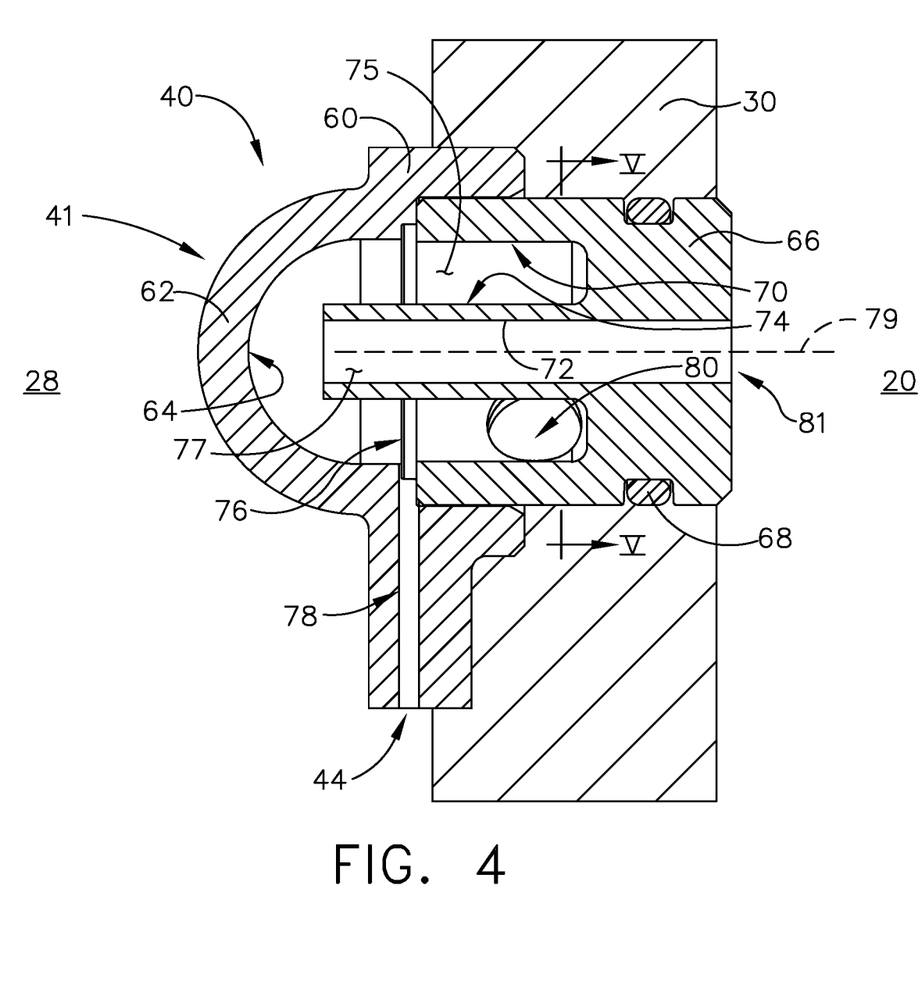
FIG. 4 is a cross-sectional view of the air-oil separator and generator assembly wall of FIG. 3, in accordance with various aspects described herein.

FIG. 4 illustrates a cross-sectional view of the air-oil separator 40 disposed at the portion of the generator end cap wall 30. As shown, the housing 41 can include a first housing 66 received in the generator end cap wall 30 and a second housing 60 at least partially overlying the first housing 66. In one non-limiting aspect, the first housing 66 can include a sealing element, such as an O-ring 68 to ensure at least a partially fluid tight receiving of the first housing 66 or air-oil separator 40 within the generator end cap wall 30.

Non-limiting aspects can be included wherein the first housing 66 is a substantially annular structure, however alternative shapes, configurations, adaptions, and the like can be included. The first housing 66 includes an inner wall, preferably disposed annularly about a longitudinal axis 79 and having an inner surface 70. A core 72 extends coaxially with the longitudinal axis 79 and the inner wall and has a hollow interior 77 or outlet conduit extending there through to the airflow outlet 81 generator cavity 20, and an exterior surface 74. In this configuration, the inner surface 70 and the exterior surface 74 define an annular separating cavity 75. The first housing 66 can be a non-annular structure, wherein the separating cavity 75 may not be annular.

At least a portion of the core 72 can extend axially along the longitudinal axis 79, including beyond an axial end of the first inner surface 70, or at least partially received within the second housing 60. At least a portion of the first inner surface 70 can define an aperture 80 fluidly connected with the air-oil mixture input 42 (not shown), such that an air-oil mixture received within the air-oil mixture input 42 is delivered or provided to the separating cavity 75 via the aperture 80. At least a portion of the air oil separator 40 or first housing 66 can be configured or adapted such that air delivered or provided to the separating cavity 75 can be further provided or delivered through the hollow interior 77 of the core 72 in an axial direction, and to the generator cavity 20 via the airflow outlet 81.

The second housing 60 can include a dome housing or a dome cap 62, such as a semi-spherical housing portion having a second inner surface 64 at least partially enclosing the separating cavity 75. At least one of the first or second housings 60, 66 can further include an oil channel 76 circumferentially arranged about one of the first or second inner surfaces 70, 64 or separating cavity 75 wall. In another non-limiting example, the oil channel 76 can be circumferentially oriented about a plane (not shown) normal to the separating cavity 75, relative to the longitudinal axis 79. As shown, the oil channel 76 can be received by, be sunk in, or be formed as a portion of the respective first or second inner surface 70, 64. In one non-limiting example, the oil channel 76 can include a capillary oil channel. As used herein, a "capillary" oil channel can include a channel so dimensioned to utilize capillary action to cause fluid or a flow of fluid to be captured, moved, distributed, or carried there through, including but not limited to utilizing patterned sidewalls of the oil channel 76. The oil channel 76 can further be fluidly connected with an oil discharge channel 78, such as a conduit or channel, ultimately connected with the removed oil outlet 44.

Figure 5:
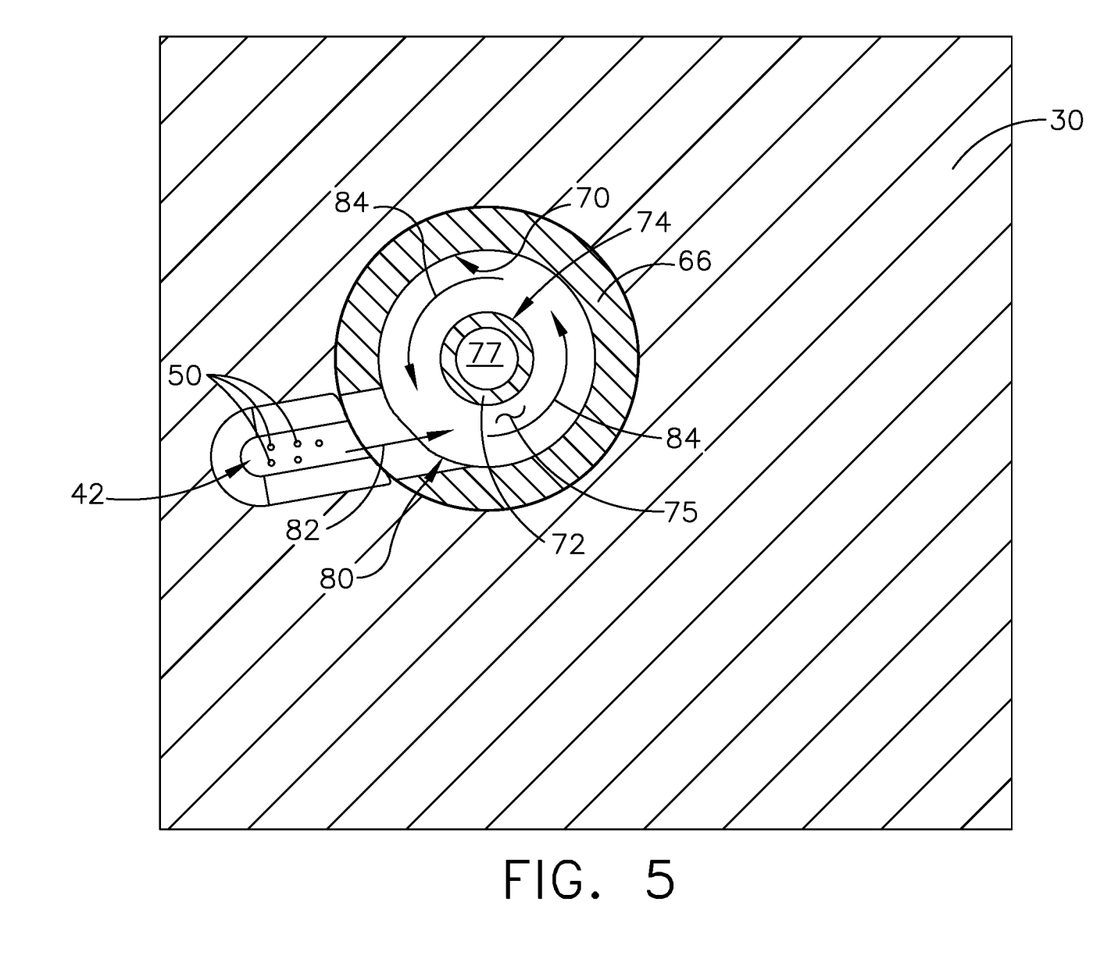
FIG. 5 is a cross-sectional view of the air-oil separator, taken along line V-V of FIG. 4, in accordance with various aspects described herein.

FIG. 5 illustrates a cross-sectional view of the air-oil separator 40, taken along an axial view of line V-V of FIG. 4. During operation of the air-oil separator 40, an air-oil mixture having oil droplets 50 can be received or drawn into the air-oil mixture input 42, and delivered in accordance with a first mixture flow 82 (schematically represented by arrow) through the aperture 80 into the separating cavity 75. As shown, at least one of the air-oil mixture input 42 or aperture 80 can be configured, shaped, or otherwise adapted such that the air-oil mixture having oil droplets 50 is received tangentially or with a small angle to the axial direction within the separating cavity 75, or by the first inner surface 70. This receiving tangentially at least partially enables or produces a circular motion 84 (schematically represented by arrows) of the air-oil mixture having oil droplets 50 in the separating cavity 75.

Figure 6:
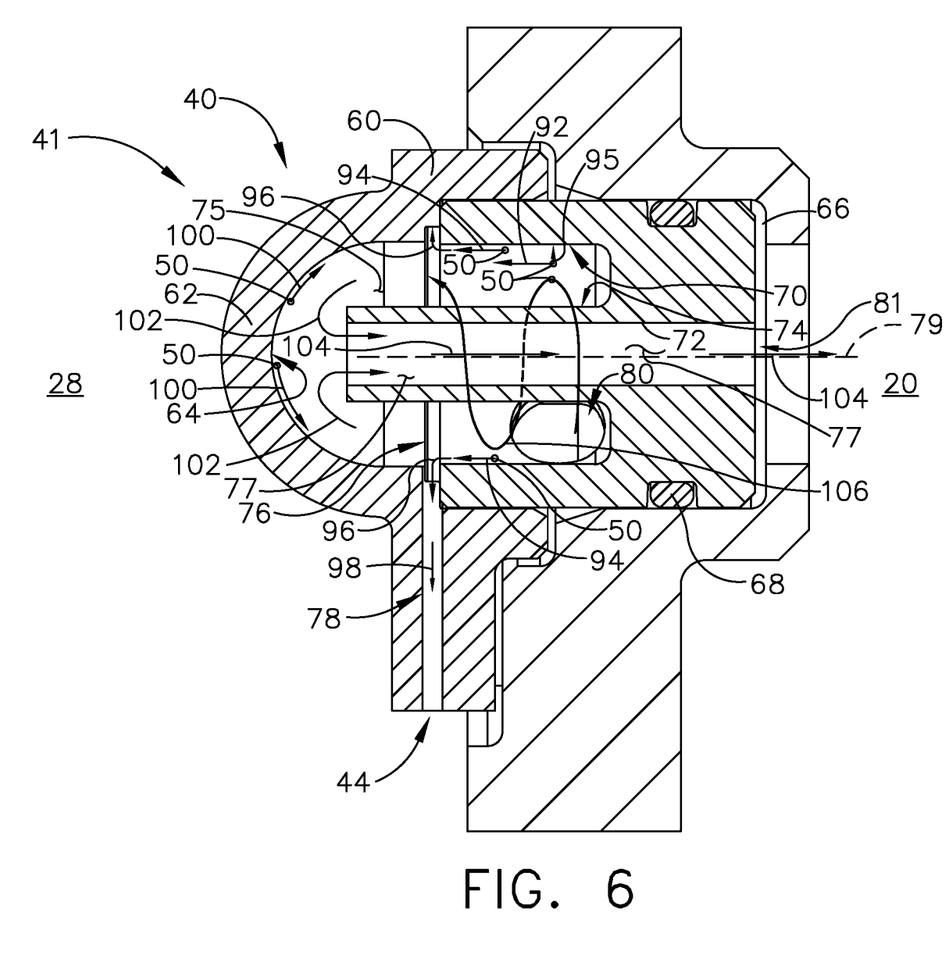
FIG. 6 is the cross-sectional view of the air-oil separator and generator assembly wall of FIG. 4, further illustrating a cyclonic flow of an air-oil mixture through the air-oil separator, in accordance with various aspects described herein.

Turning now to FIG. 6, the flow of the air-oil mixture is described. As previously explained, the air-oil mixture having oil droplets 50 is received tangentially through the aperture 80. In addition to the circular motion described with respect to FIG. 5, the airflow is further drawn or received along the longitudinal axis 79 toward the second housing 60, as the airflow will be drawn ultimate toward the hollow interior 77 or outlet conduit of the core 72 before being provided to the generator cavity 20. The combination of the axial motion with the circular motion results in a cyclonic movement 106 (schematically represented as arrow) or helical movement of the air-oil mixture through the separating cavity 75. As shown with a representative oil droplet 50, the cyclonic movement 106 imparts or effects a radially outward movement 95 (represented by arrow) on the oil droplet 50 due to the tangential movement of the cyclonic movement 106. As used herein, "tangential movement" includes the tendency of the oil droplet 50 suspended in the air-oil mixture to be directed radially outwardly, and can be understood as the centripetal forces acting upon the representative oil droplet 50. In addition to the radially outward movement 95, the cyclonic movement 106 also imparts or effects an axial movement 92 (represented by arrow) on the oil droplet 50, toward at least one of the dome cap 62 or the second housing 60 due to the lower pressure differential draw of the generator cavity 20, as explained herein. In this sense, the first inner surface 70 can be configured or adapted to flow oil droplets 50 along the surface 70.

Collectively, the radially outward movement 95 and the axial movement 92 tend to move the oil droplets 50 out of suspension in the air-oil mixture toward the first inner surface 70, and furthermore, along the first inner surface 70 in an axial motion 94 toward the oil channel 76. With sufficient axial motion 94, the oil droplets 50 are carried, moved, forced, or draw toward the oil channel 76, as shown by movement 96. The resulting mixture traversing along the cyclonic movement 106 can be significantly free of oil droplets 50 suspended in the air flow. The dome cap 62 or the second inner surface 64 can be further adapted to redirect the flow 102 from the separating cavity 75 to the hollow interior 77 or outlet conduit of the core 72.

In the event that some oil droplets 50 are not completely removed from the air-oil mixture, the cyclonic movement 106, or at least one of the radially outward movement 95 and the axial movement 92 can further deposit one or more oil droplets 50 along the second inner surface 64 of the dome cap 62, as shown. However, due to the curvature, contour, shape, or the like of the second inner surface 64, the oil droplets 50 received here are drawn along the second inner surface 64 backwardly 100 (that is, at least partially opposing the axial direction movement 92 illustrated due to the cyclonic movement; represented schematically by arrow) toward the oil channel 76. In this sense, the first inner surface 70 can be configured or adapted to flow oil droplets 50 along the surface 70. In the aforementioned example motion 100, the radially outward movement 95 or centripetal forces acting on the oil droplet 50 can overcome the axial movement 92 due to the second inner surface 64 configuration of the dome cap 62. The movement 100 can thus flow the oil droplets 50 upstream toward the oil channel 76, relative to the cyclonic movement 106.

The resulting oil-free airflow 102 (or substantially oil-free airflow) is then received by the opening of the hollow interior 77 of the core 72, and is axially carried (e.g. flow 104) by the pressure differential to the generator cavity 20 via the airflow outlet 81. In this sense, the dome cap 62 or second inner surface 64 can further be adapted to redirect the flow 102 from a first axial direction (such as via motion 92) to a second opposing direction (such as motion 104). In one non-limiting example, aspects of the disclosure described herein can remove more than 95% of the oil droplets 50 suspended in an air-oil mixture.

Oil droplets 50 removed from the air-oil mixture that are moved into the oil channel 76 can be further transferred or moved 98 (schematically represented by arrow) toward the oil discharge channel 78 or the removed oil outlet 44 by way of capillary action, gravity, or a combination thereof.

The air-oil separator 40 or assembly described herein can enable or provide separation of a fluid from an air-fluid mixture, in accordance with aspects of the disclosure. Thus, as described herein, aspects of the disclosure can include a method, including directing a fluid flow including an air-oil mixture into a housing 60, 66 having an inner wall 64, 70 defining a cyclonic separating cavity 75 defining an axis 79, removing the oil 50 from the fluid flow by way of centripetal forces acing on the oil 50 and delivering the oil 50 to an oil channel 76 sunk in the inner wall 64, 70, and whereby the helical flow is along a first direction 92 parallel with the axis 79. The method further includes redirecting the fluid flow to an air outlet 81 coaxial, the redirected fluid flow in a second direction 104 parallel with the axis 79 and opposite to the first direction 92, by a dome cap 62 enclosing the separating cavity 75 fluidly downstream of the helical flow.

One non-limiting advantage of the disclosure can include integrating the generator with the gear box. An integrated generator and gear box reduces the generator assembly or system weight and volume, and make a single coolant or oil lubrication system more effective. As described herein, the air-oil separator is implemented to filter out the droplets & provide a clean air flow into the generator cavity from the integrated generator assembly.

Another advantage that can be realized in the above aspects is that the above described aspects reduce oil received in the generator cavity and improve generator operating efficiency. "Dirty" air (e.g. with oil droplets) received by the generator cavity can adversely reduce generator efficiency by causing higher windage losses in the generator. Additionally, by utilizing capillary action with the oil channel, the removed oil can be received by the oil discharge channel regardless of gravitational orientation of the air-oil separator or generator (e.g. less reliant on gravitational forces).

Many other possible aspects and configurations in addition to that shown in the above figures are contemplated by the present disclosure. Additionally, the design and placement of the various components, or coolant flows therebetween, can be rearranged such that a number of different in-line configurations could be realized.

To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air-oil separator, comprising:
 a housing having a cavity wall defining a separating cavity fluidly connected with an air-oil mixture inlet, the separating cavity defining a longitudinal axis;
 an outlet conduit fluidly connected with an air outlet, and disposed within the separating cavity and coaxial with the separating cavity;
 a semi-spherical dome cap enclosing the separating cavity; and
 an oil channel defined by a plane normal to the axis and arranged about an entire circumference of the cavity wall, and sunk into the cavity wall, and fluidly connected with an oil channel outlet;
 wherein the oil channel is adapted to receive oil removed by cyclonic separation from a flow containing an air-oil mixture fluid received by the air-oil mixture inlet, and wherein the dome cap is adapted to redirect the flow from the separating cavity to the outlet conduit.

2. The air-oil separator of claim 1 wherein the oil channel is a capillary oil channel.

3. The air-oil separator of claim 1 wherein the housing, separating cavity, and dome cap are adapted to flow the air-oil mixture in a cyclonic fluid flow through the air-oil separator.

4. The air-oil separator of claim 3 wherein the cavity wall is adapted to flow oil removed by the cyclonic separation.

5. The air-oil separator of claim 3 wherein the oil channel is fluidly downstream of the separating cavity, and wherein the oil removed flows along the cavity wall towards the oil channel.

6. The air-oil separator of claim 5 wherein the oil channel is fluidly upstream of the dome cap.

7. The air-oil separator of claim 6 wherein the dome cap has an inner surface adapted to flow oil removed by the cyclonic separation.

8. The air-oil separator of claim 7 wherein the oil removed by cyclonic separation flows along the inner surface toward the oil channel.

9. The air-oil separator of claim 1 wherein the housing is received by a wall separating a first compartment having an air-oil mixture fluid at a first pressure from a second compartment having a second pressure less than the first pressure, the housing having a cavity wall defining a separating cavity fluidly connected with an air-oil mixture inlet at the first compartment, and wherein the outlet conduit is fluidly connected with an air outlet at the second compartment.

10. The air-oil separator of claim 9 wherein each of the first compartment and the second compartment are external to the housing.

11. An air-oil separator, comprising:
- a housing having a cavity wall defining a separating cavity fluidly connected with an air-oil mixture inlet, the separating cavity defining a longitudinal axis;
- an outlet conduit fluidly connected with an air outlet, and disposed within the separating cavity and coaxial with the separating cavity;
- a dome cap enclosing the separating cavity; and
- an oil channel extending along an entire circumference of the cavity wall and defining an enclosed ring depression along the cavity wall, the ring defined by a plane normal to the axis, and wherein the oil channel fluidly connected with an oil channel outlet;
- wherein the oil channel is adapted to receive oil removed by cyclonic separation from a flow containing an air-oil mixture fluid received by the air-oil mixture inlet, and wherein the dome cap is adapted to redirect the flow from the separating cavity to the outlet conduit.

12. The air-oil separator of claim 11 wherein the oil channel is a capillary oil channel.

13. The air-oil separator of claim 11 wherein the oil channel is fluidly downstream of the separating cavity, and wherein the oil removed flows along the cavity wall towards the oil channel.

14. A method of separating oil from an air-oil mixture fluid, the method comprising:
- directing a fluid flow including an air-oil mixture into a housing having an inner surface defining a cyclonic separating cavity defining an axis;
- removing the oil from the fluid flow by way of centripetal forces acing on the oil and delivering the oil to an oil channel sunk along a ring defined by a plane normal to the axis, wherein the ring encircles an entire circumference of the inner surface, and whereby a helical flow is along a first direction parallel with the axis; and
- redirecting the fluid flow to an air outlet coaxial with the cyclonic separating cavity, the redirected fluid flow in a second direction parallel with the axis and opposite to the first direction, by a semi-spherical dome cap enclosing the separating cavity fluidly downstream of the helical flow.

* * * * *